Nov. 20, 1934.  L. J. CORRIER ET AL  1,981,833

GAS METER

Filed June 25, 1931   2 Sheets-Sheet 2

INVENTORS.
Louis J. Corrier
Joseph F. Greiner
By ATTORNEY

Patented Nov. 20, 1934

1,981,833

UNITED STATES PATENT OFFICE 1,981,833

GAS METER

Louis J. Corrier and Joseph F. Greiner, Erie, Pa., assignors to American Meter Company, New York, N. Y., a corporation of Delaware Application June 25, 1931, Serial No. 546,741

1 Claim. (Cl. 73—1)

It very frequently happens that the gas delivered to gas meters contains substances which it is desirable to intercept, more particularly where such substances are injurious to the gas meter. This is particularly true as to the valve surfaces and working parts. The present invention is designed to provide a simple and convenient means by which such substances may be intercepted at the meter so that with the simple installation of the meter such means is provided. In carrying out the invention, therefore, we provide the meter passages with a receptacle in which is arranged a filter receptacle being of sufficient size with relation to the passages to accommodate the filtering material and at the same time permit of a capacity flow of gas through the meter. Features and details of the invention will appear from the specification and claim.

A preferred embodiment of the invention is illustrated in the accompanying drawings as follows:—

Figure 1:
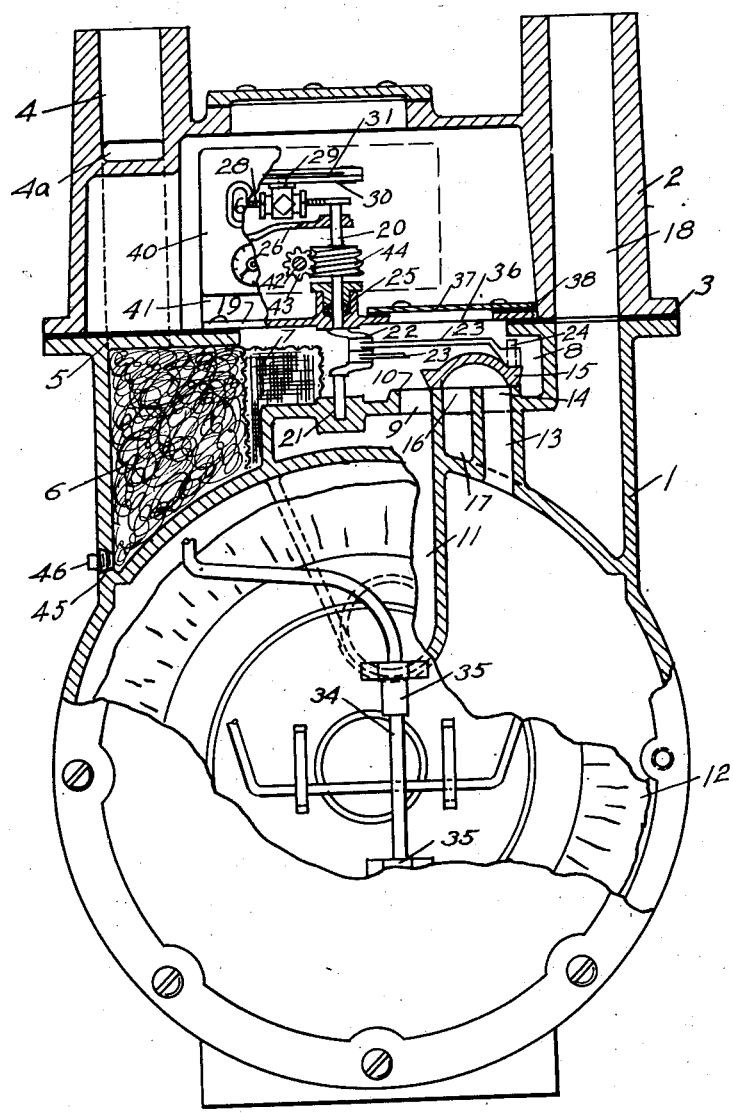
Figure 2:
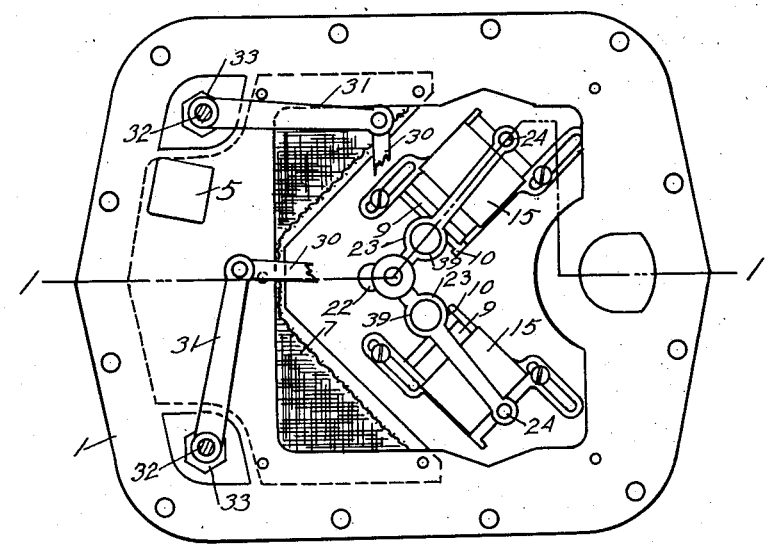

Fig. 1 shows an elevation of a meter, a part being broken away to a section on the line 1—1 in Fig. 2.

Fig. 2 a top view of the meter with the top portion of the case removed.

Figure 3:
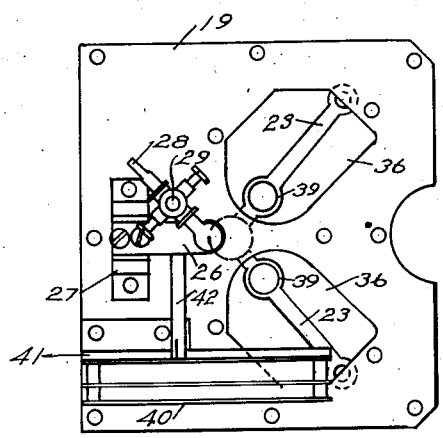

Fig. 3 a plan view of the sealing plate showing the parts mounted thereon.

Figure 4:
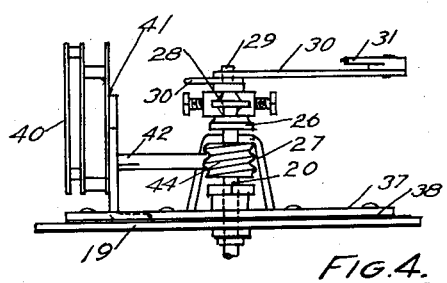

Fig. 4 a side elevation of the sealing plate with the parts thereof.

Figure 5:
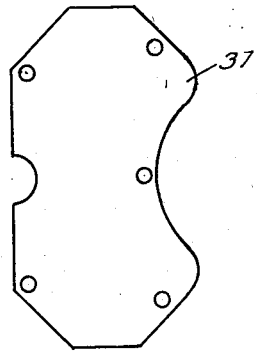

Fig. 5 a closure plate for closing the service openings in the sealing plate.

The case has a lower portion 1 and an upper portion 2a. The upper portion has a gas inlet 2 and the portions are sealed with relation to each other by a gasket 3. An inlet passage 4 is arranged in the upper portion of the case and has an off-set 4a giving clearance for a flag arm. The passage 4 leads through an opening 5 in the lower portion of the case. The opening 5 leads to a filter receptacle 6 in the lower portion of the case and there is arranged over the receptacle a screen 7. The gas passes from the filter receptacle through the screen into a valve compartment 8 which in the example shown is in the lower portion of the case. The gas passes from the valve compartment through a port 9 in a valve seat 10, thence by a passage 11 to a diaphragm 12 which is arranged in a diaphragm chamber in the lower portion of the case. The gas on the other side of the diaphragm returns through a passage 13, port 14, valve 15, port 16, discharge passage 17 to a discharge conduit 18 in the upper portion of the case. The upper portion of the case includes a tangent chamber. It will be noted that the valve chamber and the filter recess are arranged abreast and between the diaphragm chamber and the tangent chamber. This permits of a very large filter receptacle without enlargement of the ordinary case, or any essential reduction of the capacity in the passages, or valve chamber.

A sealing plate 19 is arranged over the top of a portion of the filter compartment and over the top of the valve compartment separating the valve compartment from the tangent chamber. The joint between the plate and the upper face of the meter is sealed by the gasket 3.

A crank post 20 has its lower end journaled in a bearing socket 21 in the bottom wall of the valve compartment. A crank 22 is arranged in the valve compartment and connecting rods 23 extend from the crank to pins 24 on the valves. The crank post extends through a stuffing box 25 into the tangent chamber in the tangent housing case and through a bearing in a supporting arm 26, this arm being supported by a bracket 27 secured on the sealing plate 19. A tangent 28 is fixed on the upper end of the crank post and is provided with the usual tangent post 29. Links 30 extend from the tangent post to flag arms 31. The flag arms 31 are fixed on the flag-staves 32, the flag-staves extending through stuffing boxes 33. The staff has the usual bail, or crank connection 34 which is connected by arms 35 with the diaphragm, it being understood that the valves, flag arms, staves and similar mechanisms are duplicated at opposite sides of the meter in the usual manner.

The sealing plate is preferably provided with small service openings 36 which may be sealed by a cover plate 37, the cover plate being provided with a gasket 38.

It will be noted that the working parts, except the valves and the flag arms with their links are all assembled on the sealing plate and that the valves are put in place in their usual manner and the sealing plate secured in place. After the sealing plate is in place the connecting rods 23 may be positioned on the pins 24 by access to the connecting rods through the openings 36. The connecting rods are provided with the usual loops 39 which may be nicely adjusted as to length. After they are in place the cover plate 37 is put in place.

A dial 40 is secured on a bracket 41 on the sealing plate and is driven by a shaft 42 having a gear 43 engaging a worm 44 on the crank post. In as much as this tangent chamber has no gas all that is necessary is to provide an opening in the case exposing the dial and the dial thus may be completely mounted and connected up on the sealing plate before these parts are put in place. Thus the convenience of the structure is very much enhanced.

A certain amount of moisture is liable to accumulate in the receptacle and this interferes with the capacity of the filter. We, therefore, provide a drainage opening 45 which is closed by a plug 46.

It will be noted that the receptacle in which the filter itself is arranged may extend across the meter and where the valve compartment is provided there is sufficient room at the side of the valve compartment for the receptacle without materially enlarging, or changing the form of the case. The construction of the case including the valve compartment is advantageously arranged to receive a filter of ample capacity. Different filtering materials may be used. We have found horse hair to give very satisfactory results as it seems to maintain its porosity and filtering effectiveness over long periods of time.

What we claim as new is:—

In a gas meter, the combination of a case separated into upper and lower portions; a diaphragm; a chamber in which the diaphragm is mounted, said chamber being in the lower portion of the case; a valve chamber; a filter receptacle; a tangent chamber, said tangent chamber being in the upper portion of the case, said valve chamber and receptacle being arranged between the diaphragm chamber and the tangent chamber, the receptacle having an opening closed by the assembling of the upper and lower portions of the case; a valve in the valve chamber; a tangent mechanism for controlling the valve in the diaphragm chamber; and a driving connection between the diaphragm and the tangent mechanism.

LOUIS J. CORRIER.
JOSEPH F. GREINER.